United States Patent
Hassner et al.

(10) Patent No.: US 7,231,578 B2
(45) Date of Patent: Jun. 12, 2007

(54) TECHNIQUES FOR DETECTING AND CORRECTING ERRORS USING MULTIPLE INTERLEAVE ERASURE POINTERS

(75) Inventors: Martin Hassner, Mountain View, CA (US); Vipul Srivastava, San Jose, CA (US)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 479 days.

(21) Appl. No.: 10/817,421

(22) Filed: Apr. 2, 2004

(65) Prior Publication Data
US 2005/0229069 A1 Oct. 13, 2005

(51) Int. Cl.
*H03M 13/17* (2006.01)
(52) U.S. Cl. .................................. 714/762; 714/762
(58) Field of Classification Search ................ 714/762, 714/769; H03M 13/17
See application file for complete search history.

(56) References Cited

U.S. PATENT DOCUMENTS

| | | | |
|---|---|---|---|
| 4,951,284 A | 8/1990 | Abdel-Ghaffar et al. | |
| 5,751,733 A | * 5/1998 | Glover | 714/769 |
| 5,946,328 A | 8/1999 | Cox et al. | |
| 6,275,965 B1 | 8/2001 | Cox et al. | |
| 2003/0147167 A1 | 8/2003 | Asano et al. | |

OTHER PUBLICATIONS

Vivek Mehta, "Error Correction for Magnetic Storage Devices", ECE 1392: Integrated Circuits for Digital Communications.
IBM Almaden Research Center, "Signal Processing/Integrated Sector Format-Error Correction Code".

* cited by examiner

*Primary Examiner*—R. Stephen Dildine
(74) *Attorney, Agent, or Firm*—Townsend and Townsend and Crew LLP; Patrick Duncan (57) ABSTRACT

Techniques for detecting and correcting burst errors in data bytes formed in a two-level block code structure. A second level decoder uses block level check bytes to detect columns in a two-level block code structure that contain error bytes. The second level decoder generates erasure pointers that identify columns in the two-level block structure effected by burst errors. A first level decoder then uses codeword check bytes to correct all of the bytes in the columns identified by the erasure pointers. The first level decoder is freed to use all of the codeword check bytes only for error byte value calculations. The first level decoder does not need to use any of the codeword check bytes for error location calculations, because the erasure pointers generated by the second level decoder provide all of the necessary error locations. This techniques doubles the error correction capability of the first level decoder.

17 Claims, 6 Drawing Sheets

TECHNIQUES FOR DETECTING AND CORRECTING ERRORS USING MULTIPLE INTERLEAVE ERASURE POINTERS

BACKGROUND OF THE INVENTION

The present invention relates to techniques for detecting and correcting errors on storage media, and more particularly, to techniques for detecting and correcting errors on storage media using multiple interleave erasure pointers in a multi-level integrated interleave format.

Data bytes are stored on magnetic media in groups referred to as codewords (sectors). Typically, 512 data bytes are stored in each codeword. The codewords of data bytes may include multiple interleaved words (i.e., data byte strings or vectors) and corresponding check bytes that are byte interleaved.

Multibyte errors are detected and corrected in long byte strings recorded on a storage medium in blocks. Each block comprises a plurality of codewords and a plurality of block-level check bytes derived from the codewords. Each codeword includes data bytes and codeword check bytes mapped from a plurality of equal-length data byte strings according to a linear error correction code.

Each block is generated and recorded by logically summing the data byte strings and by mapping the logical sum and the data byte strings into counterpart codewords. The counter part codewords include codeword check bytes in accordance with the same linear error correction code. Next, the codewords are logically summed. The codewords and their logical sum are interleaved in a predetermined pattern prior to being recorded on a storage device or the like.

Additional details of a technique for detecting and correcting error bytes is discussed in U.S. Pat. No. 5,946,328, which is incorporated by reference herein. Three data streams $m_1(x)$, $m_2(x)$, and $m_3(x)$ are used as an example. Two of the data streams $m_1(x)$ and $m_2(x)$ are encoded by a first Reed-Solomon (RS) linear encoder that produces respective codewords $c_1(x)$ and $c_2(x)$. This first RS encoder appends $2t_1$ check bytes to each of the codewords.

The third datastream $m_3(x)$ is modified to form the logical (modulo 2) sum of $m_1(x)+m_2(x)+m_3(x)$ prior to encoding by a second RS encoder. This second RS encoder includes $2t_1+2t_2$ check bytes within a codeword $c'(x)$ of the logically-summed datastream. The codeword $c_3(x)$ represents the logical sum of the three codewords $c_1(x)+c_2(x)+c'(x)$. The third codeword $c_3(x)$ contains $2t_2$ shared block check bytes and $2t_1$ individual check bytes when generated in this manner. The block check bytes are inside and an intrinsic part of the RS codeword.

Two of the codewords $c_1(x)$ and $c_2(x)$ are generated by linear error correction encoding of respective data byte strings $m_1(x)$ and $m_2(x)$. Codewords $c_1(x)$ and $c_2(x)$ require $2t_1$ check bytes. The codeword $c'(x)$ are also generated by the linear encoding of the modulo 2 sum of $m_1(x)$, $m_2(x)$, and $m_3(x)$. Codeword $c'(x)$ requires $2t_1+2t_2$ check bytes. Data byte strings $m_1(x)$ and $m_2(x)$ are appended with $2t_2$ zeroes denoted by $\phi(x)$ in order to secure equal codeword length. The codeword outputs may then be expressed as:

$$c_1(x)=x^{2t1+2t2}m_1(x)+\phi(x)+r_1(x)$$

$$c_2(x)=x^{2t1+2t2}m_2(x)+\phi(x)+r_2(x)$$

$$c'(x)=x^{2t1+2t2}[m_1(x)+m_2(x)+m_3(x)]+r(x)$$

The codeword $c'(x)$ is further processed to produce a modified and third codeword $c_3(x)$ by summing the three codewords $c_1(x)$, $c_2(x)$, and $c'(x)$ modulo 2 such that:

$$c_3(x)=[c_1(x)+c_2(x)]+c'(x)=x^{2t1+2t2}m_3(x)+r_B(x)+r_3(x)$$

The check bytes $r_B(x)$ are the block check bytes shared by $m_1(x)$, $m_2(x)$, and $m_3(x)$, whereas $r_3(x)$ are the individual check bytes of data stream $m_3(x)$.

The check bytes $r_1(x)$, $r_2(x)$, and $r_3(x)$ are first level check bytes. These check bytes can only be used to correct $t_1$ errors in data bytes within codewords $c_1(x)$, $c_2(x)$, $c_3(x)$, respectively. The check bytes $r_B(x)$ in codeword $c_3(x)$ are second (block) level check bytes that can be used to correct $t_1+t_2$ data byte errors in any one of codewords $c_1(x)$, $c_2(x)$, and $c_3(x)$.

Following these computations, an integrated interleaved block of codewords $c_1(x)$, $c_2(x)$, and $c_3(x)$ is written out to the disk. Subsequently, when the disk must execute a read or read modify write command or the like, an addressed block or blocks of codewords are streamed from their track locations on the disk. Any errors on the disk are detected and corrected on the fly based on the syndrome processing of the codewords. The syndromes are derived from the purported codewords and their logical sum modulo 2. A non-zero syndrome indicates an error byte. Any nonzero syndromes are identified and processed over the codewords to correct the bytes in error. The updated block-level nonzero syndromes are also processed to locate and correct bytes in error in any single codeword that exceeds the correction capability of that codeword.

U.S. Pat. No. 6,275,965, which is incorporated herein by reference, describes a system that corrects error bytes in a two-level code structure. Up to a maximum of $t_1$ error bytes in a codeword can be located and corrected using $2t_1$ check bytes per codeword. A codeword with error bytes exceeding its $t_1$ codeword correction capacity is a bursty subblock. Up to a maximum of $t_1+t_2$ error bytes can be located and corrected in as many as B bursty subblocks using $B*(2t_2)$ block-level check bytes.

A post-encoding process is provided to "de-interleave" or redistribute the computed codewords into modified codewords such that the data vectors and their codeword check bytes are located in the same codeword. The block-level check bytes are distributed among the codewords.

The techniques described in the '965 patent are useful for correcting error bytes that occur in random locations with the codewords. However, the number of error bytes in the codewords can exceed the correction capability of the techniques described in the '965 patent. These types of errors are referred to as burst errors. Burst errors can occur, for example, as the result of a scratch or defect on a magnetic disk.

Therefore, it would be desirable to provide additional techniques for detecting and correcting burst errors occurring in data bytes that are formed in a two-level block code structure.

BRIEF SUMMARY OF THE INVENTION

The present invention provides techniques for detecting and correcting burst errors in data bytes formed in a two-level block code structure. According to the present invention, a second level decoder uses block level check bytes to detect columns in a two-level block code structure that contain error bytes. The second level decoder generates erasure pointers that identify columns in the two-level block structure that have been effected by burst errors.

A first level decoder then uses codeword check bytes to correct all of the bytes in the columns identified by the erasure pointers. The present invention frees up the first level decoder to use all of the codeword check bytes only for error byte value calculations. The first level decoder does not need to use any of the codeword check bytes for error location calculations, because the erasure pointers generated by the second level decoder provide all of the necessary error locations. The error correction capability of the first level decoder is doubled, because all of the codeword check bytes are freed up to be used only for error value calculations.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1A:
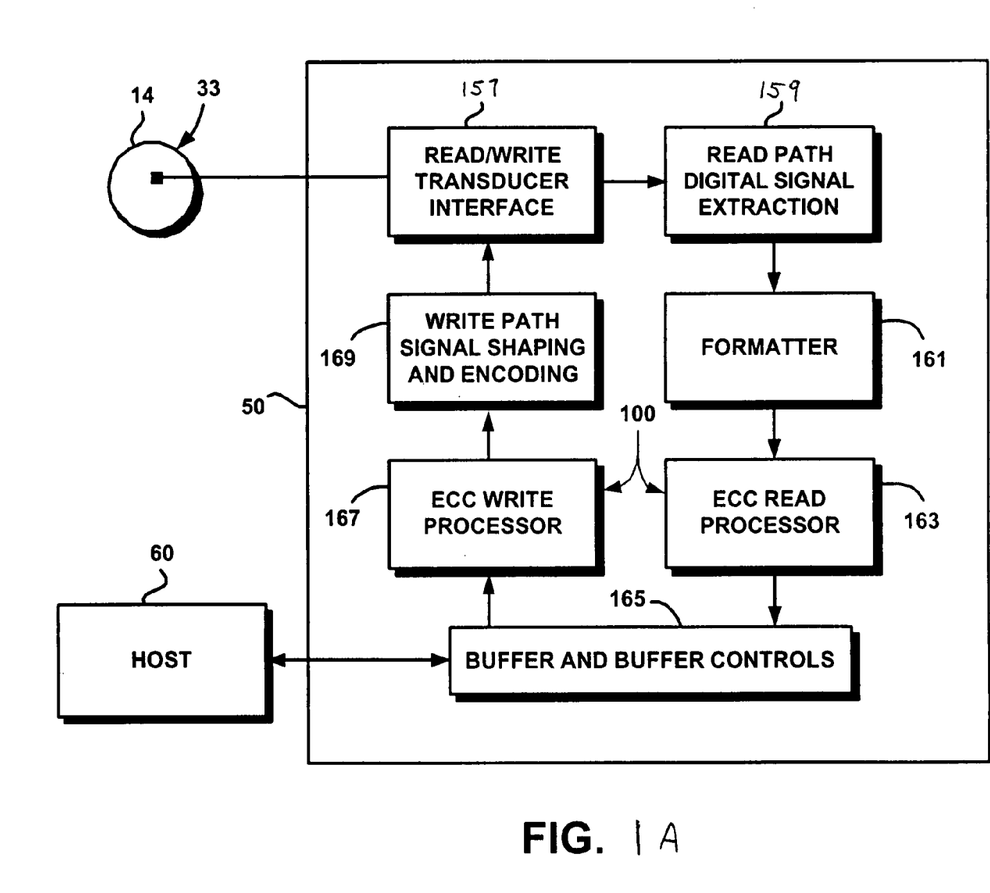
FIG. 1A is a block diagram detailing the architecture of a buffered hard disk drive controller that includes an on-the-fly error correction code (ECC) system for implementing on-the-fly error correction code.
Figure 1B:
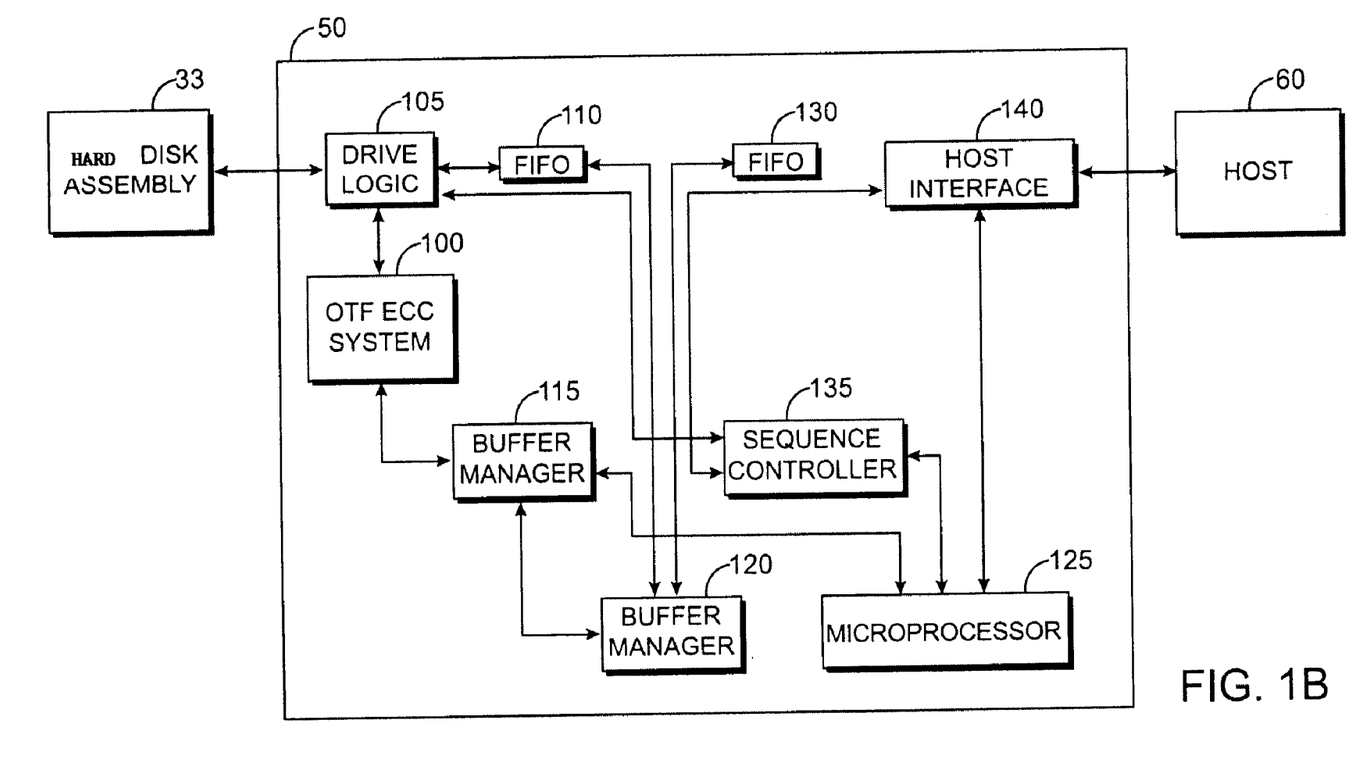
FIG. 1B is a block diagram of a data storage system depicting data flow along a read channel and a write channel of the hard disk drive controller of FIG. 1A.

FIGS. 1A and 1B illustrate an example of a hard disk drive control system for reading and writing data onto a magnetic hard disk. The hard disk drive control system of FIGS. 1A–1B is an example of hard disk drive system that can implement techniques of the present invention that are described above. The hard disk drive system of FIGS. 1A–1B detect and correct errors in the data read from a disk. The hard disk drive system of FIGS. 1A–1B can be used to implement the error correction techniques of the present invention, which are discussed in further detail below.

FIG. 1A illustrates an exemplary architecture of a buffered hard disk drive controller 50. Hard disk drive controller 50 is configured to read data from and write data to a magnetic hard disk 14. Controller 50 includes an on-the-fly error correction code (ECC) system 100 for implementing an on-the-fly error correction code. On-the-fly error correction code system 100 includes an ECC read processor 163 and an ECC write processor 167.

FIG. 1B is a block diagram of the hard disk drive controller 50 of FIG. 1A that includes an on-the-fly error correction code system 100. When sequences of digital binary data are to be written onto the disk 14, they are placed temporarily in a buffer 165 shown in FIG. 1A and subsequently processed and transduced along a write path or channel (167, 169, and 157).

The hard disk drive controller 50 includes a logic drive circuit 105 shown in FIG. 1B that formats data from hard disk assembly 33, for example from 8 bits to 32 bits. A disk assembly 33 is comprised of disk 14 and a head stack assembly including a spindle motor. A FIFO register 110 stores the formatted data and exchanges the same with a sector buffer 120. The ECC system 100 receives the formatted data from the drive logic circuit 105 and performs an error correction coding algorithm. ECC system 100 can also perform the techniques and processes of the present invention, which are discussed in detail below.

A buffer manager 115 controls data traffic between the ECC system 100, a sector buffer (i.e., random access memory) 120, and a microprocessor 125. Another FIFO register 130 stores data and exchanges the same with the sector buffer 120. A sequence controller 135 is connected between the drive logic circuit 105, the microprocessor 125, and a host interface 140, to control the sequence operation of the data traffic and various commands across the hard drive controller 50. The host interface 140 provides an interface between the hard drive controller 50 and a host 60.

First, a predetermined number of binary data elements, also termed bytes, in a data string are moved from the buffer 165 and streamed through an ECC write processor 167. In the ECC write processor 167, the data bytes are mapped into codewords drawn from a suitable linear block or cyclic code such as a Reed-Solomon code. Next, each codeword is mapped in a write path signal-shaping unit 169 into a run length limited or other bandpass or spectral-shaping code and changed into a time-varying signal. The time-varying signal is applied through an interface read/write transducer interface 157 and then to the write element in a magneto resistive (or other suitable transducer head) for conversion into magnetic flux patterns.

All of the measures starting from the movement of the binary data elements from buffer 165 until the magnetic flux patterns are written on a selected disk track as the rotating disk 14 passes under the read/write head are synchronous and streamed. For purposes of efficient data transfer, the data is de-staged (written out) or staged (read) a codeword at a time.

Thus, both the mapping of binary data into Reed-Solomon codewords and the conversion to flux producing time-varying signals must be done well within the time interval defining a unit of recording track length moving under the transducer. Typical units of recording track length are equal fixed-length byte codewords of 512 bytes.

When sequences of magnetic flux patterns are to be read from the disk 14, they are processed in a read path or channel (157, 159, 161, and 163) and written into the buffer 165. The time-varying signals sensed by a transducer are passed through the read/write transducer interface 157 to a digital signal extraction unit 159. Here, the signal is detected and a decision is made as to whether it should be resolved as a binary 1 or 0. As these 1's and 0's stream out of the signal extraction unit 159, they are arranged into codewords in the formatting unit 161.

Because the read path is evaluating sequences of Reed-Solomon codewords previously recorded on the disk 14, absent error or erasure, the codewords should be the same. In order to test whether that is the case, each codeword is applied to an ECC read processor 163 over a path from a formatter 161.

Also, the output from the ECC processor 163 is written into buffer 165. The read path also operates in a synchronous data-streaming manner such that any detected errors must be located and corrected within the codeword well in time for the ECC read processor 163 to receive the next codeword read from the disk track. The buffer 165 and the read and write channels may be monitored and controlled by the microprocessor 125 to ensure efficacy where patterns of referencing may dictate that a path not be taken down, such as sequential read referencing.

Data bytes are typically stored in a data storage disk in codewords. Subsets of the codewords are grouped into long blocks. Each codeword contains first level CRC/ECC bytes, and each block includes second level $ECC_B$ bytes.

A data storage system uses the first level CRC and ECC bytes to locate and to correct errors in data bytes within a codeword. When there are too many errors in the data bytes to be corrected by the first level ECC bytes, the data storage system uses the second level $ECC_B$ bytes to correct the errors as described in detail above. $ECC_B$ bytes are used for correcting data bytes in any of the codewords in a block. Miscorrection of an error can happen when both of the first level and the second level CRC and ECC bytes are in error.

Further details of multiple level, integrated sector format, error correction code, encoding and decoding processes for data storage or communication devices is discussed in further detail in U.S. patent application Publication US 2003/0147167 A1, published Aug. 7, 2003, to Asano et al., which is incorporated by reference herein.

Burst errors (also called hard errors) occur when a scratch or defect on a storage medium such as a magnetic disk wipes out several adjacent data bytes. Because data bytes are stored next to each other on a magnetic disk in codewords and blocks of data bytes, burst errors wipe out data bytes that are located next to each other within the codewords of a block of data.

The present invention provides techniques for detecting and correcting data bytes that have been corrupted by burst errors on a storage medium. The techniques of the present invention take advantage of the fact that burst errors result in corrupted data bytes that are located next to each other within codewords of a block.

A plurality of data streams are encoded to generate codewords as discussed above and in further detail in U.S. Pat. Nos. 5,946,328 and 6,275,965. The codewords include data bytes and check bytes. The codewords include two levels of check bytes. Each codeword $c_1, c_2, c_3, \ldots$ includes a first level check byte $r_1, r_2, r_3, \ldots$, respectively, that can be used to correct $t_1$ data bytes with errors. One or more of the codewords also include second (block) level check bytes $r_B$ that can be used to correct $t_1+t_2$ data bytes in any of the codewords that have errors.

The codewords that contain only the first level check bytes are referred to as the first level codewords. The codewords that contain the second level check bytes are referred to as the second level codewords.

Figure 2:
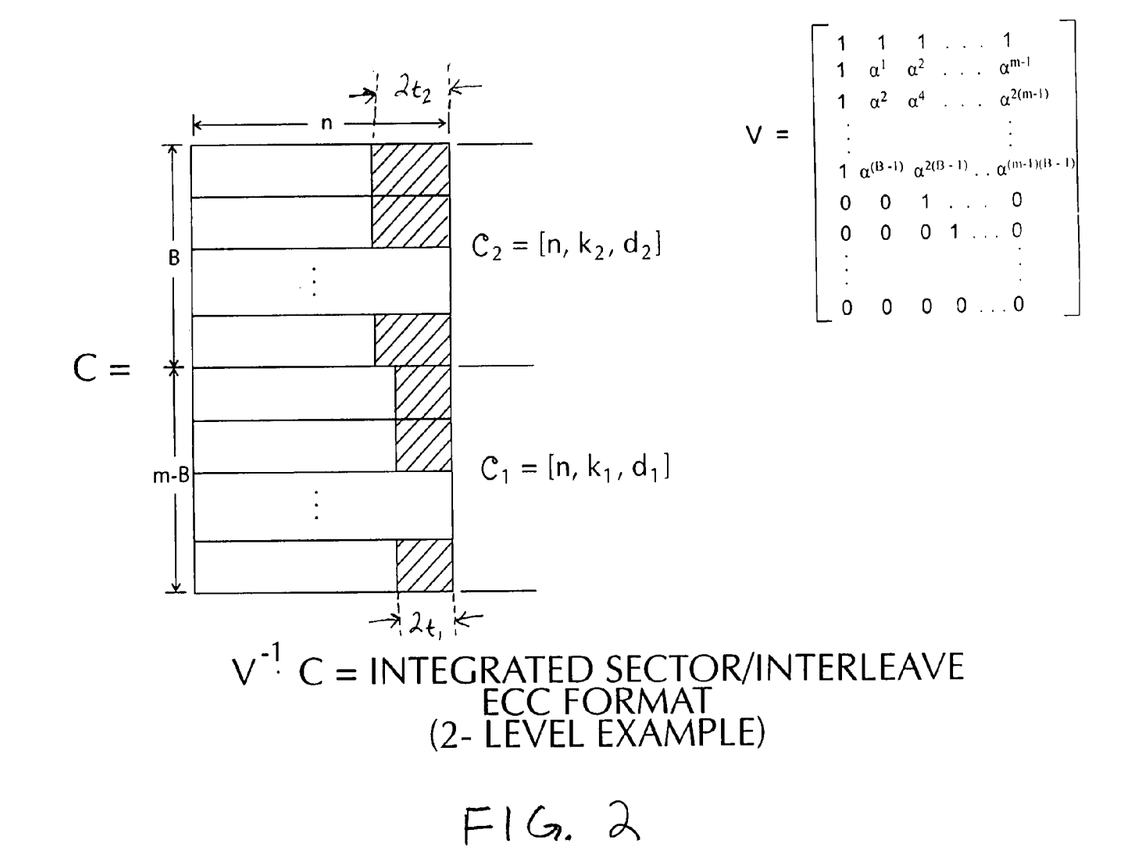
FIG. 2 illustrates a two-level block code structure according to the present invention.

In an interleaved format, the first and second level codewords are arranged in a two-level block code structure. The block can be expressed such that each codeword $c_1, c_2, c_3 \ldots$ is a row in the block as shown in FIG. 2. The first level codewords are nested to form a first code C1 in the block, and the second level codewords are nested to form a second code C2 in the block.

Each codeword has n total bytes. The number of data bytes in each first level codeword is k1. The number of data bytes in each second level codeword is k2. Each of the first level codewords has $2t_1$ check bytes, and each of the second level codewords has $2t_2$ check bytes. B is the number of bursty codewords that are correctable, and m is the number of data vectors.

The Hamming distance between two codewords is the number of symbols in which they disagree. It can be shown that to correct T byte errors, a coding scheme requires the use of codewords with a Hamming distance of at least 2T+1 between the codewords. The Hamming distance of the first code C1 is $d_1=2t_1+1$. The Hamming distance of the second code C2 is $d_2=2t_2+1$, where $d_1<d_2$.

The block C shown in FIG. 2 includes codes C1 and C2. Block C is applied to the inverse of an integrating matrix $V^{-1}$ to redistribute the data vectors, the codeword check bytes, and the block-level check bytes, as discussed in further detail with respect to. FIGS. 5 and 6 of U.S. Pat. No. 6,275,965. The integrating matrix is shown in FIG. 2.

A decoder is used to generate the error location and correction values from the syndromes detected in any of the codewords that form an interleaved block. Before decoding a block, the block is first de-multiplexed to separate out the data byte strings, block check bytes, and the codeword check bytes so that they can be validity tested. The syndrome generators generate syndromes for the codewords in the block. Syndrome generating techniques are well-known to those of skill in the art.

The syndromes derived from the codewords are applied to a first level Reed-Solomon decoder. The first level Reed-Solomon decoder can detect and correct up to $\tau_i$ bytes in error in any single codeword. Reed-Solomon decoders are well known to those skilled in the art.

Figure 3:
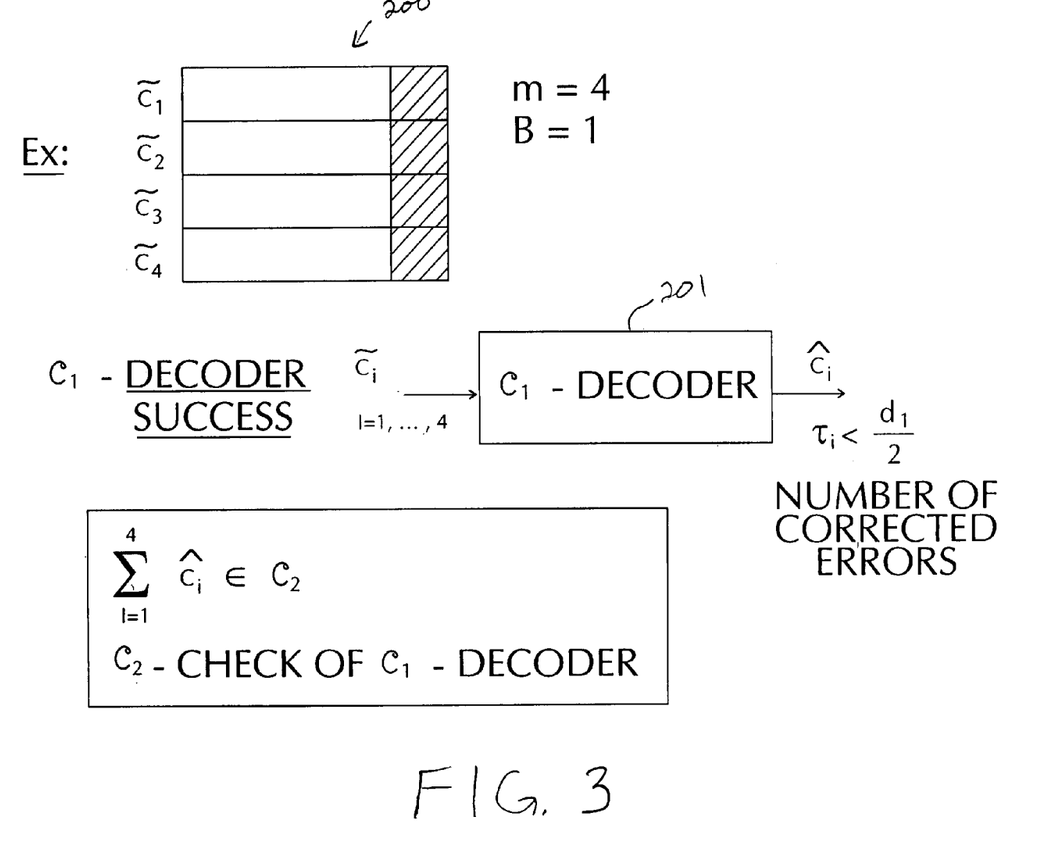
FIG. 3 illustrates a first level decoder for detecting and correcting random errors according to the present invention.

FIG. 3 illustrates an example of a block 200 that contains four codewords $c_1, c_2, c_3$, and $c_4$. Each codeword includes a data vector m and check bytes (the shaded portion). There are four data vectors m in block 200 and B=1. The codewords $c_i$ are applied to a first level decoder 201.

Decoder 201 can detect and correct random errors occurring in data vectors in the codewords. Decoder 201 uses syndromes to detect and correct up to $\tau_1$ bytes in error in any one of the four codewords. Decoder 201 outputs corrected codewords $c'_i$. The corrected codewords include the corrected data vectors. The number of errors that are corrected $\tau_i$ is less than half the first level Hamming distance ($\tau_i<d_1/2$).

Another syndrome generator produces any nonzero syndromes based on the second (block) level check bytes in the block. These syndromes are modified to remove the effects of any errors located by the first level decoder. If the updated syndromes are zero, the correction computed by the first level decoder is deemed correct. If, however, the updated syndromes are nonzero or if the first level decoder detects a failure, then the first level syndromes in the phase that failed and the second level block syndromes are applied to a second level Reed-Solomon decoder.

Figure 4:
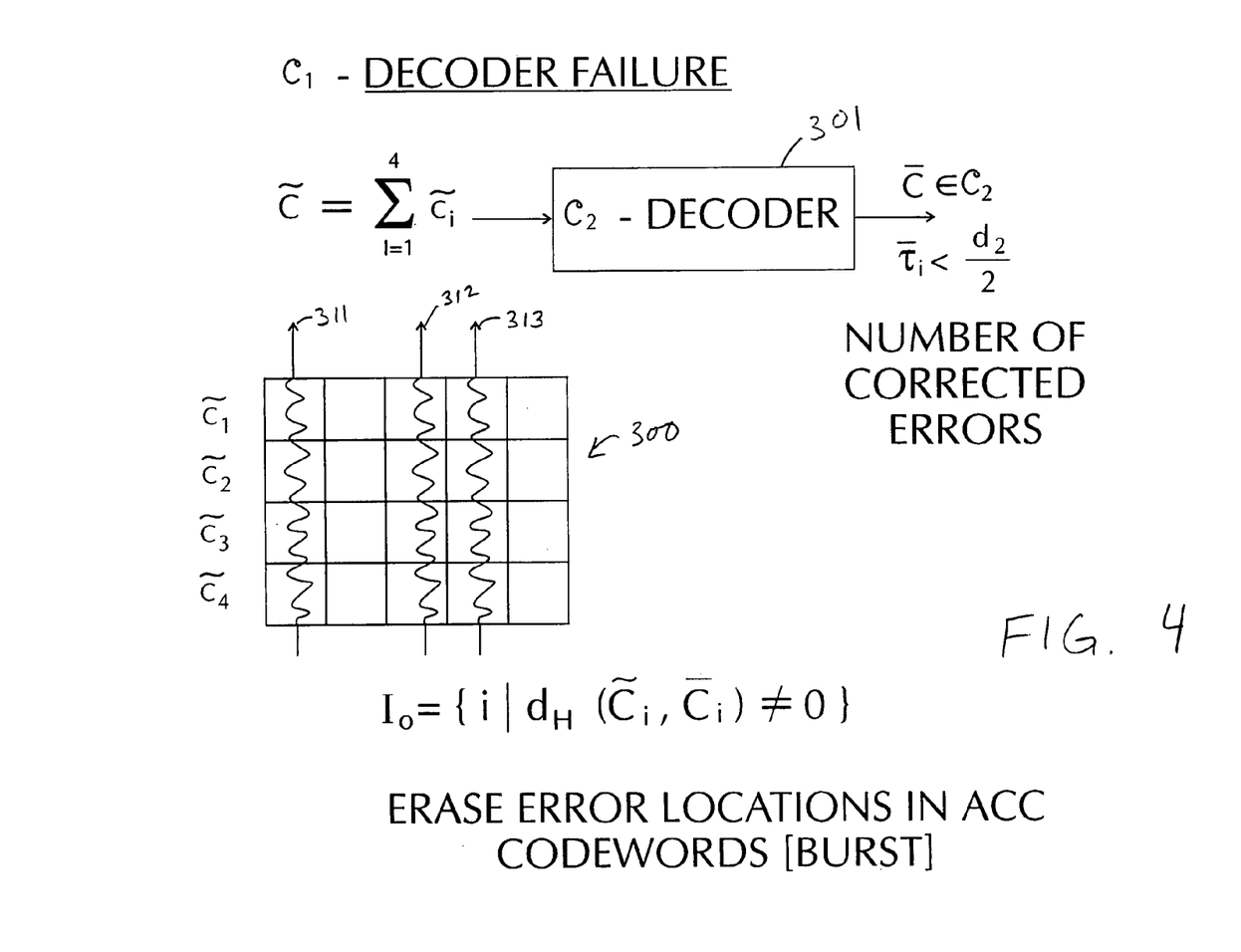
FIG. 4 illustrates a second level decoder for detecting burst errors according to the techniques of the present invention.

Thus, if the first level decoder 201 is unsuccessful at correcting the errors in one of the codewords, the second level Reed-Solomon decoder attempts to correct the bytes in error. A second level Reed-Solomon decoder uses the codeword check bytes and the block check bytes to correct bytes in error as shown in FIG. 4. The second level decoder can correct up to $\tau_2$ bytes in error in the sum of all the codewords.

The two level block structure is such that the sum of all of the interleaves is a codeword in the second code C2. In the presence of a burst error, adjacent symbols in a codeword are erased. The symbols in the second level codeword, obtained as the sum of all the interleaves, are sums of adjacent symbols in the codeword. Thus, error locations computed by the second level decoder are natural erasure locations for all of the interleaves. The present invention takes advantage of this fact to locate and correct burst errors.

The codewords $c_i$ are applied to a second level decoder 301 shown in FIG. 4. Second, level decoder 301 can locate columns in a two-level block code structure that have been affected by burst errors. Decoder 301 receives syndromes generated from the codeword check bytes and syndromes generated from the block level check bytes. Using these syndromes, decoder 301 can detect the columns that contains errors.

Second level decoder 301 outputs erasure pointers $E_i$. The erasure pointers point to columns of bytes in the two-level block structure that contain errors. Thus, the second level code C2 is only used to detect the locations of error bytes in the block. Because burst errors affect adjacent bytes, typically an entire column of bytes in a block is wiped out. The second level code C2 (that includes the block level check bytes) identifies the columns that have the errors. In a burst error situation, it is likely that many or all of the bytes in an effected column contain errors. The first level code C1 is then used to correct all of the bytes in the columns identified by the erasure pointers.

For example, block 300 in FIG. 4 contains four codewords $c_1$, $c_2$, $c_3$, and $c_4$. Erasure pointers 311, 312, and 313 point to the first, third, and fourth byte columns in block 300. The number of errors that can be corrected $\tau_2$ is less than half the second level Hamming distance ($\tau_2 < d_2/2$).

Figure 5:
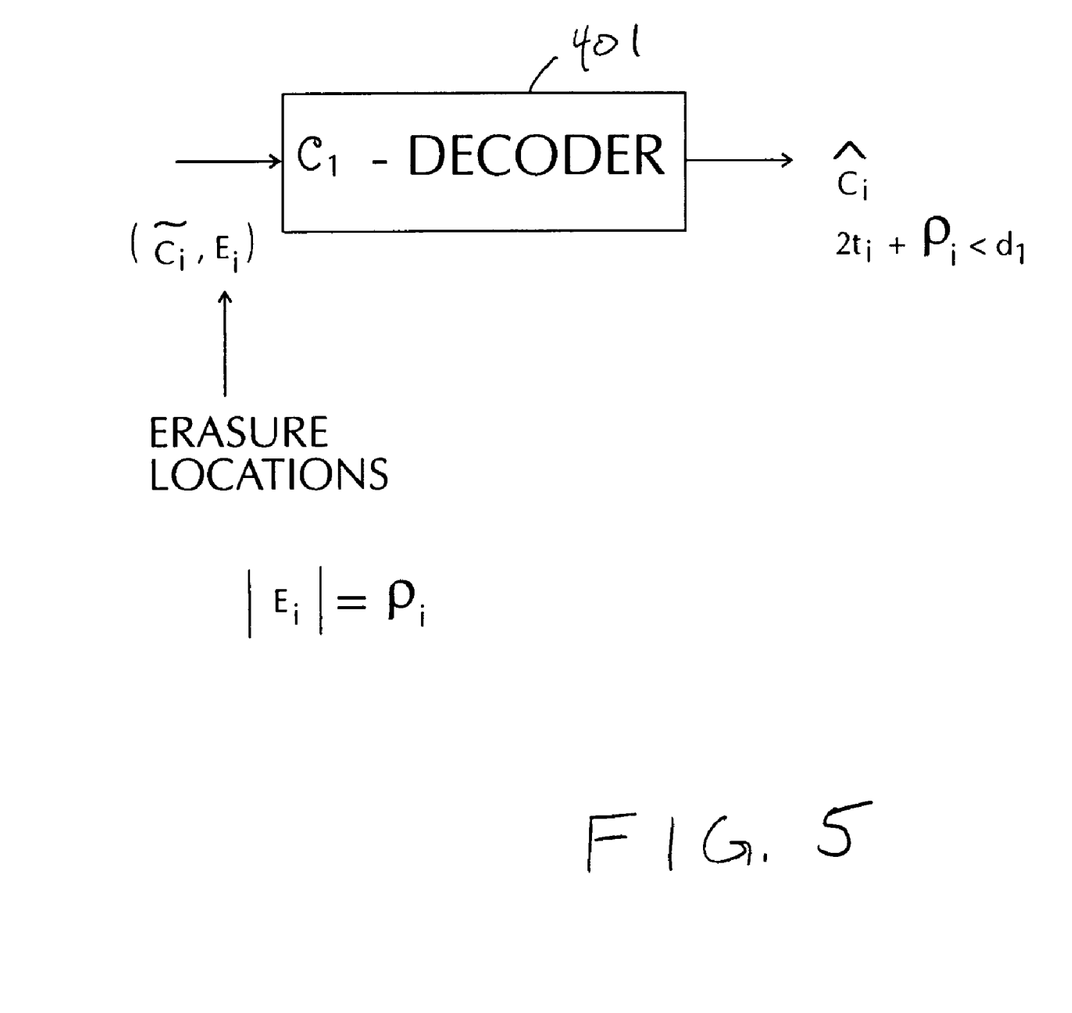
FIG. 5 illustrates a first level decoder for correcting burst errors according to the techniques of the present invention.

The erasure pointers $E_i$ and the codewords $c_i$ are then inputted into a first level decoder 401 as shown in FIG. 5. First level decoder 401 corrects burst errors in a two level block code structure that has been previously processed by second level decoder 301. Decoder 401 interprets the erasure pointers generated by second level decoder 301 as locations of the bytes in error. Each erasure pointer points to a block column that contains error bytes. The first level decoder 401 uses the first level codeword check bytes to correct each of the bytes in the columns identified by the erasure pointers. The first level decoder 401 outputs corrected codewords $c'_i$. If the number of erasure pointers $E_i$ equals $\rho_i$, then all possible combinations of $\tau_i$ and $\rho_i$ are true such as that $2\tau_i + \rho_i < d_1$.

According to the present invention, the second level decoder 301 only uses the block level check bytes to detect the columns that contain error bytes. The block level check bytes are not used for error correction. The first level decoder 401 then uses the codeword check bytes and the erasure pointers to correct all of the bytes in the identified columns.

This technique frees up the first level decoder to use the codeword check bytes only for error value calculations, because the first level decoder does not need to use any of the codeword check bytes for error location calculations. The error correction capability of the first level decoder doubles, because all of the codeword check bytes are freed up to be used for error byte value calculations. Prior art systems used the first level check bytes for error detection and correction.

As discussed above, the prior art techniques described in U.S. Pat. Nos. 5,946,328 and 6,275,965 are useful for correcting random errors in data streams organized in a two-level block structure. The system may not be able to determine if the errors are random errors or burst errors. Therefore, if the prior art techniques fail to correct all of the bytes in error, the techniques of the present invention can be attempted to correct the bytes in error. If the errors are burst errors, the present invention is more likely to be able to correct all of the bytes in error.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiment disclosed, but that the invention will include all embodiments and equivalents falling within the scope of the claims.

What is claimed is:

1. A disk drive controller that corrects multiple burst errors in data bytes, the disk drive controller comprising:
   a first level decoder; and
   a second level decoder that uses block level check bytes to detect columns in a two-level block structure of data bytes containing burst errors,
   wherein the second level decoder generates erasure pointers that identify the columns in the two-level block structure containing the burst errors,
   the first level decoder uses codeword check bytes in the two-level block structure to correct all of the data bytes in the columns identified by the erasure pointers, and
   the first level decoder does not use any of the codeword check bytes for error location calculations.

2. The disk drive controller according to claim 1 wherein the first level decoder is configured to detect and correct random errors in the two-level block structure of data bytes using the codeword check bytes.

3. The disk drive controller according to claim 2 wherein the second level decoder uses the block level check bytes to correct random errors in a codeword if the first level decoder does not correct all of the random errors, and
   the second level decoder only generates the erasure pointers if the first level and the second level decoders do not correct all of the random errors.

4. The disk drive controller according to claim 1 wherein the disk drive controller de-interleaves the two level block structure of data bytes to separate out the data bytes, the block level check bytes, and the codeword check bytes.

5. The disk drive controller according to claim 1 wherein the disk drive controller generates syndromes that are used for error correction for the data bytes in the two-level block structure.

6. The disk drive controller according to claim 1 wherein the two-level block structure of data bytes is applied to an inverse of an integrating matrix V−1 to redistribute the data bytes, the codeword check bytes, and the block level check bytes.

7. The disk drive controller according to claim 1 wherein the first and the second level decoders are Reed-Solomon decoders.

8. The disk drive controller according to claim 1 wherein the disk drive controller includes an ECC read processor and an ECC write processor.

9. A disk drive system that corrects multiple burst errors in data bytes, the disk drive system:
   a disk assembly comprising a disk and a head stack assembly that includes a spindle motor; and
   a disk drive controller chipset that includes first level and second level decoders,
   wherein the second level decoder uses block level check bytes to detect columns in a two-level block structure of data bytes that contains burst errors,
   the second level decoder generates erasure pointers that identify the columns in the two-level block structure containing the burst errors, and
   the first level decoder uses codeword check bytes in the two-level block structure to correct all of the data bytes in the columns identified by the erasure pointers.

10. The disk drive system according to claim 9 wherein the first level decoder does not use any of the codeword check bytes for error location calculations, and the first level decoder uses all of the codeword check bytes used for error value calculations.

11. The disk drive system according to claim 10 wherein the first level decoder is configured to detect and correct random errors occurring in the data bytes using the codeword check bytes before the second level decoder is used to detect the burst errors.

12. The disk drive system according to claim 11 wherein the second level decoder uses the block level check bytes to correct random errors in a codeword if the first level decoder does not correct all of the random errors.

13. The disk drive system according to claim 9 wherein the disk drive controller chipset de-interleaves the two level block structure of data bytes to separate out the data bytes, the block level check bytes, and the codeword check bytes.

14. The disk drive system according to claim 9 wherein the disk drive controller chipset generates syndromes for codewords in the two-level block structure.

15. The disk drive system according to claim 9 wherein the disk drive controller chipset includes an ECC read processor and an ECC write processor.

16. The disk drive system according to claim 9 wherein the first and the second level decoders are Rood-Solomon decoders.

17. The disk drive system according to claim 9 wherein two-level block structure of data bytes is applied to an inverse of an integrating matrix V−1 to redistribute the data bytes, the codeword check bytes, and the block level check bytes.

* * * * *